United States Patent [19]

Spence, deceased et al.

[11] Patent Number: 4,853,010

[45] Date of Patent: Aug. 1, 1989

[54] MULTI STAGE GAS SCRUBBER

[76] Inventors: Billy F. Spence, deceased, late of Houston, Tex.; by Eva L. Spence, legal representative, 8202 Research Blvd., No. 207, Austin, Tex. 78758; Jesus F. Balandrano, deceased, late of Monterrey, Mexico, Julia Balandrano, legal representative

[21] Appl. No.: 650,240

[22] Filed: Sep. 12, 1984
(Under 37 CFR 1.47)

[51] Int. Cl.⁴ .................. B03C 3/36; B01D 47/02; B04C 5/13
[52] U.S. Cl. .................. 55/122; 55/127; 55/256; 55/260; 55/235; 55/392; 55/412; 55/426; 55/459.1; 209/144
[58] Field of Search .................. 55/122, 124, 127, 128, 55/391, 392, 394, 235, 256, 260, 410, 411, 412, 426, 459 R, 459 A, 459 B, 459 C, 459 D; 209/144, 128, 130, 129

[56] References Cited

U.S. PATENT DOCUMENTS

| | | | |
|---|---|---|---|
| 602,964 | 4/1898 | Van Gelder | 55/411 |
| 825,297 | 7/1906 | Brunck | 55/260 X |
| 1,122,371 | 12/1914 | Douglas | 55/391 |
| 1,841,556 | 1/1932 | Stelz | 55/410 X |
| 2,081,772 | 5/1937 | Saint-Jacques | 55/127 X |
| 3,414,248 | 12/1968 | Iwanaga et al. | 55/256 X |
| 3,504,481 | 4/1970 | Zakarian et al. | 55/256 X |
| 3,822,533 | 7/1974 | Oranje | 55/394 |
| 4,214,880 | 7/1980 | Kamphorst | 55/256 X |
| 4,352,681 | 9/1982 | Dietz | 55/127 |

FOREIGN PATENT DOCUMENTS

| | | | |
|---|---|---|---|
| 623343 | 7/1961 | Italy | 55/235 |
| 768470 | 5/1979 | U.S.S.R. | 55/459 R |
| 263738 | 1/1927 | United Kingdom | 55/410 |
| 376555 | 7/1932 | United Kingdom | 55/459 R |
| 411123 | 5/1934 | United Kingdom | 55/412 |

Primary Examiner—David L. Lacey
Assistant Examiner—Thomas M. Lithgow
Attorney, Agent, or Firm—Pravel, Gambrell, Hewitt, Kimball & Krieger

[57] ABSTRACT

A gaseous stream scrubber includes a cylindrical housing having a curved outer wall for confining therewithin a gaseous stream to be scrubbed. A flow inlet communicates with the housing and introduces the polluted gaseous stream into the housing, the inlet having an axis of flow tangentially placed with respect to the cylindrical housing central axis so that the inflowing gaseous stream creates a circular flow path which spins within the cylindrical housing and about the central axis of the cylindrical housing. A first flow outlet discharges gas from the housing. A centrally placed vortex tube having a bore is centrally positioned in the housing so that the circular flow stream surrounds the vortex tube during operation. In the preferred embodiment, the vortex tube is cylindrical and has a central axis which coincides with the central axis of the cylindrical housing. The vortex tube includes an outlet for discharging gaseous flow from the housing and through the bore of the tube. A passage in the form of one or more openings in the vortex tube allows gas flow between the circular flow path and the vortex tube bore. An electrostatic field associated with the passage repels particulate matter which attempts to flow from the circular path to the vortex tube. Heavier material settles in the lower portion of the housing were it can be withdrawn and disposed of. A first outlet communicates with a chemical bath so that light, particulate matter can be chemically treated.

6 Claims, 1 Drawing Sheet

U.S. Patent    Aug. 1, 1989    4,853,010
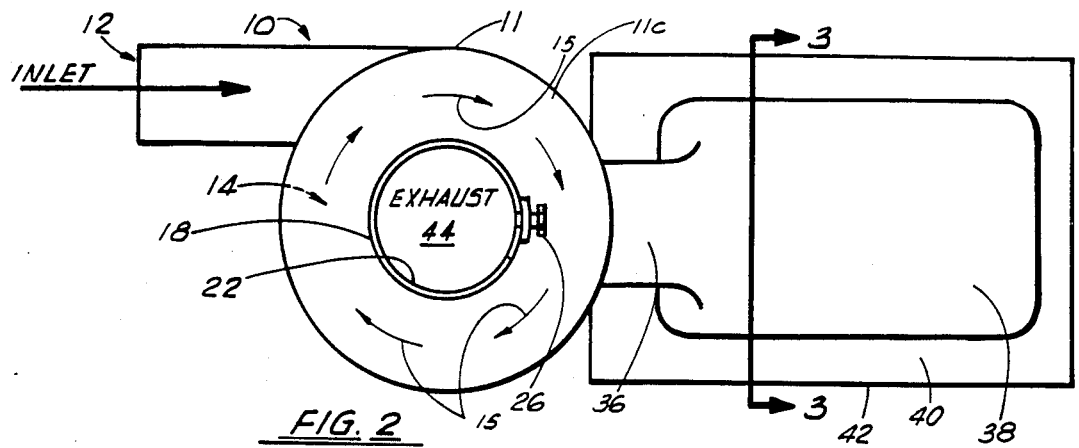
FIG. 2
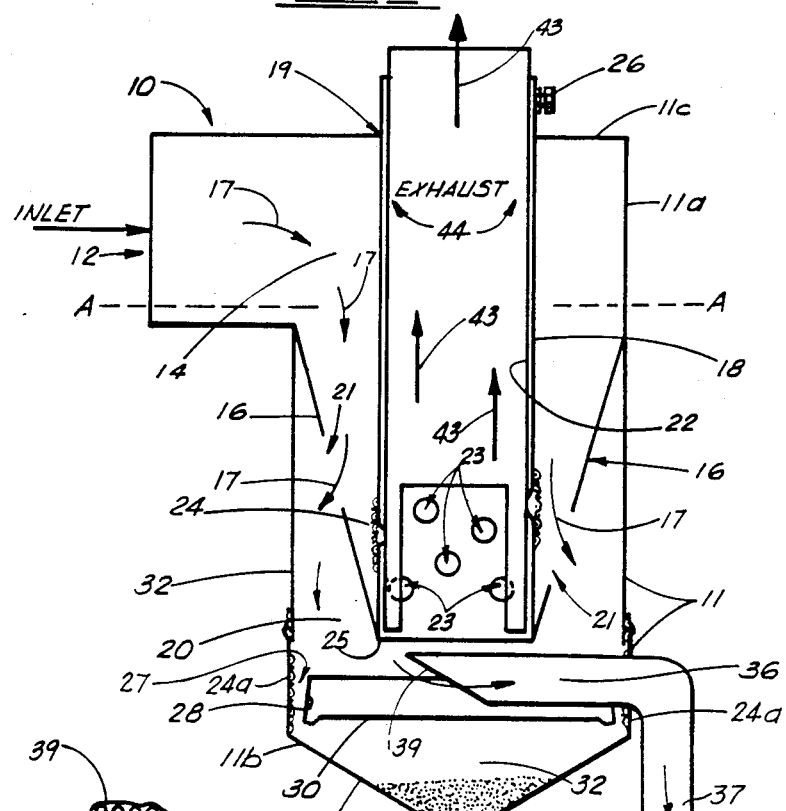
FIG. 4
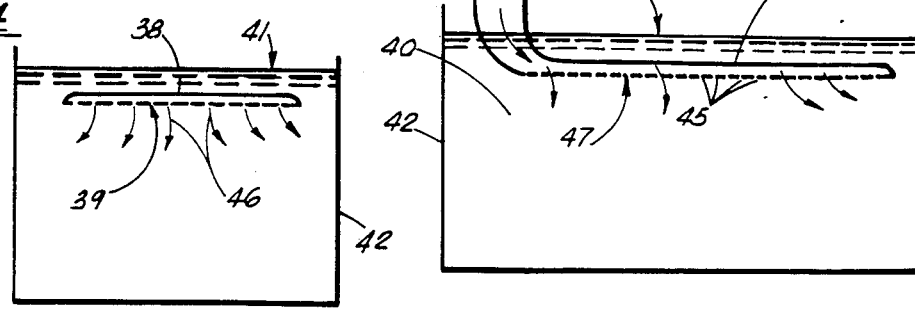
FIG. 3
FIG. 1

MULTI STAGE GAS SCRUBBER

BACKGROUND OF THE INVENTION

1. Technical Field

The present invention relates to air pollution control devices and more particularly relates to a multi-section air pollution controller which circulates an influent gaseous waste stream to be treated into a rotational circular path, removing heavier particles from a first component of the gaseous stream by centrifugal force, and wherein a central vortex tube withdraws a second component portion of the gaseous stream from the housing, the first portion of the gaseous stream being bubbled through a chemically reactive bath for treatment, and the second component passing through a charged field that repels undesirable gaseous pollutants.

2. General Background

It is well known that many undesirable particles are contained within polluted air such as smoke. These particles have adverse effects upon the environment if they are allowed to escape into the atmosphere untreated. For example, many gaseous particles such as sulphur dioxide are produced and are a part of smoke produced by the combustion of fuels with a sulphur content. Such sulphur dioxide, for example, is a common component of smoke prouced by the combustion of lignite coal and other coals with similar sulphur content. Because the smoke produced by the combustion of such coals produces particles of different sizes and physical conditions including solid, large and heavier particles as well as smaller particles, a significant removal problem is presented. For example, smoke produced by the combustion of coal can produce large solid heavier particles such as carbons, ashes, powders and the like. Various smaller and lightweight particles such as sulphur dioxide are also produced.

Various types of equipment have attempted to solve the problem of cleaning a polluted stream of gaseous material. For example, one type of equipment is referred to as "scrubbers." A scrubber is, for example, an apparatus which washes the smoke as it is released from the stack of a power plant, factory or the like. The scrubbing acts upon the size, weight, and physical characteristics of the particles which are a product of combustion. These scrubbers create a used water by-product which becomes polluted and a settled sludge that requires further secondary equipment for additional treatments in order to restore the water to its natural properties and natural cleanliness. Thus, solving the initial problem of cleaning the polluted air stream creates a second problem as severe as the first problem in many cases, namely the polluted water.

Various types of "dry" devices are used to clean polluted streams of gas or air. These devices include cyclone separators which generally rotate the gaseous material in a circular path so that heavier particles gravitate to the outside of the separator and a lighter portion of the gaseous stream remains at the vortex of the separator and can be separated there from the heavier particles. However, the lighter gaseous particles are generally not affected by the cyclone effect.

One cyclonic separator can be seen in U.S. Pat. No. 1,773,840 issued to Nattcher on Aug. 26, 1930. This device includes an upper round opening used to release air after a cleaning process and a lower cone which collects particles which have fallen by their own weight and slid down the cylindrical walls of the separator. Such an apparatus is only effective on very large solid particles because the gaseous particles are generally not affected by the cyclonic forces, thus gaseous pollution would be released from the apparatus to the atmosphere untreated. This type of device is referred to generally as a "dry" type apparatus for cleaning air pollution.

Another "dry" type apparatus is seen in U.S. Pat. No. 3,478,494 issued to E. L. Lustenader. The device is basically a vortex, electrostatic separator allegedly used to remove particles of small mass or size as well as large mass or size. The device collects larger particles in a collector which is round and connected with the opening of the tubular main part of the apparatus. The device would not be effective for the disposal of gaseous pollution such as sulphur dioxide.

A wet cyclone type apparatus for treating gaseous pollution can be seen in U.S. Pat. No. 3,527,026 issued to Mitsugi Miura on Sept. 8, 1970. That device includes a cyclone provided with a sprayer in a gas discharge pipe and includes a hopper spaced from the wall of the cyclone filled with liquid, the gas discharge pipe extending into the liquid. The device relates to an apparatus for separating allegedly fine particles in a gaseous substance. The present invention differs from this device in that the present invention does not require water sprays which by definition create a secondary pollution in the form of water pollution. This is different from the Miura device which uses a combination of cyclonic separation and liquid scrubbing.

Another cyclone type patent can be seen in U.S. Pat. No. 3,527,026. In that device, the cyclone is limited to large particles and also to small streams and flows.

U.S. Pat. No. 3,546,851 issued to L. C. Hardison on Dec. 15, 1977 shows a scrubber type treatment device. The apparatus includes a duct, a valve, and a sprayer working against the flow of saturated smoke. The device uses a two-stage process, a first stage of spraying and a second of centrifugal mixing. The apparatus appears to link the scrubbing effect, i.e., the spraying of liquid against the flow of smoke with centrifugal force to make the particles react with the liquid by surface contact thus generating a circular movement in the liquid. This device suffers in that it produces a contaminated liquid and a contaminated sludge and thus the need for another process and equipment to treat the liquid and/or sludge to dispose of it. This apparatus differs from the present invention in that no scrubbing is used as part of the apparatus.

Another scrubber can be seen in U.S. Pat. No. 3,572,164 issued to J. Mercer on Mar. 23, 1971. This device is a scrubber which basically sprays water against a flow of smoke.

Another typical scrubber is seen in the Tretter U.S. Pat. No. 3,853,505. The Tretter patent uses water spraying against the smoke in combination with a cyclonic effect to separate condensed particles by weight, the particles falling afterwards and sliding by the inside walls of the cyclone.

It is to these problems that the present invention is directed.

GENERAL DISCUSSION OF THE PRESENT INVENTION

The present invention provides a gaseous stream scrubber having a cylindrical housing with an outer curved wall for confining therewithin a gaseous stream to be treated. A flow inlet communicates with the housing and introduces the gaseous stream to be treated in the housing, the inlet having an axis of flow tangentially placed with respect to the housing central axis so that the gaseous stream entering the housing creates a circular flow path of the gaseous stream. A first flow outlet discharges a primary gaseous component of the stream from the housing. A vortex tube having a central bore is positioned centrally in the housing so that the circular flow stream entering the housing surrounds the vortex tube. In the preferred embodiment, the vortex tube and the cylindrical housing each have central axes which coincide. The lower end portion of the vortex tube includes a passage in the form of one or more small openings which allow gas flow between the circular flow path in the housing and the vortex tube bore. Repelling means associated with the passage repels particulate matter which attempts to flow from the circular path to the vortex tube. In the preferred embodiment, the housing includes a trap at its lower end portion for collecting heavier particulate matter which falls into the lower section of the housing such as, for example, the heavier particles of a gaseous stream such as smoke produced by the combustion of coals wherein the heavier particles include carbons, ashes, powders and the like.

The first flow outlet discharing the primary gaseous component communicates with a bubbler disposed within a chemical bath. The bubbler mechanically breaks up the primary component of the gaseous stream into small bubbles so that they can chemically react with the chemical contained within the chemical bath. In the preferred embodiment, the pollution control apparatus includes a frustroconically shaped baffle which divides the housing interior into first and second sections with the inlet introducing the gaseous stream into the first section and the first flow outlet being disposed within the second section. In the preferred embodiment, the first and second sections are respectively placed above and below one another.

Further, in the preferred embodiment, the primary outlet is downstream of the baffle means. The repelling means can be, for example, an electrically charged screen the vortex tube openings. The screen would preferably be charged in such a way as to repel small particles such as sulphur dioxide so that they would move from the first to the second section of the housing and not enter the vortex tube. Thus, the sulphur dioxide particles would form part of the primary gaseous component and move to the lower interior of the housing and from there enter the bubbler. The bubbler means can be an elongated laterally expanded perforated member which is submerged in the chemical bath and connected at its other end to the primary flow outlet.

BRIEF DESCRIPTION OF THE DRAWINGS

For a further understanding of the nature and objects of the present invention, reference should be had to the following detailed description, taken in conjunction with the accompanying drawings in which the parts are given like reference numerals and wherein:

FIG. 1 is a sectional, elevational view of the preferred embodiment of the apparatus of the present invention;

FIG. 2 is a top view of the preferred embodiment of the apparatus of the present invention;

FIG. 3 is a sectional view taken along lines 3—3 of FIG. 1; and

FIG. 4 is a fragmentary view illustrating the bottom of the bubbler portion of the preferred embodiment of the apparatus of the present invention.

DETAILED DESCRIPTION OF THE PREFERRED EMBODIMENT

FIGS. 1 and 2 best illustrate the preferred embodiment of the apparatus of the present invention designated generally by the numeral 10. Air pollution apparatus 10 includes a cylindrical housing 11 including an upper housing 11a and a lower housing 11b which can be integrally connected or removably connected by suitable interlocking means such as bolting, strapping, or the like. Housing 11 is preferably cylindrical as best seen in FIG. 2. The housing would be preferably of uniform diameter. An inlet 12 communicates with housing 11. Inlet 12 is tangentially placed with respect to cylindrical housing 11 as best seen in FIG. 2 so that an incoming polluted gaseous stream to be cleaned is introduced into the housing along an axis of flow which is tangentially placed with respect to the central axis of housing 11 thereby creating a circular flowpath of the gaseous stream. In FIG. 2, the curved arrows 15 illustrate the circular path traveled by the gaseous stream which enters housing 11 through inlet 12. As more fully described herein, the polluted gaseous stream such as smoke (hereinafter referred to as simply the gaseous stream) is separated into first and second components which discharge from apparatus 10 at bubbler 38 and exhaust 44 respectively.

Inlet 12 is preferably placed at the upper portion of housing 11 as best illustrated by FIG. 1. While the flow of gas from inlet 12 to housing 11 creates the circular flowpath as illustrated by the arrows 15 in FIG. 2, a top to bottom flowpath is also created as illustrated by the arrows 17 in FIG. 1. The top 11c of housing 11 is closed, forming a seal with the wall of vortex tube 18 at 19.

The opposite end portion of vortex tube 18 forms a connection with frustroconical baffle 16. Openings 21 in baffle 16 allow gas to flow between the upper interior 14 of housing 11 and the low 20 interior portion thereof.

Vortex tube 18 provides a continuous wall 22 which defines a central hollow bore 44. Bore 44 also functions as an outlet for gas leaving apparatus 10 as best illustrated by the arrows 43 of FIG. 1.

FLow of gas between upper interior 14 and the bore 44 of vortex tube 18 is through openings 23 formed at the lowermost end portion 25 of vortex tube 18. Each opening 23 is covered with screen 24 which could be a very small mesh. Screen 24 is preferably an electrode charged with a low voltage but sufficient to repel a desired particle to be removed from the gaseous stream. Thus, particles attempting to enter vortex tube 18 bore 44 would be repelled by screen 24 so that such particles would flow from upper interior 14 of housing 11 through openings 21 in baffle 16 and into lower interior 20 portion of housing 11. Vortex tube 18 carries an inner tube 22 having openings 23 which are positioned in a pattern that corresponds to the pattern of openings on tube 18. Thus, upward and downward movement of tube 22 with respect to tube 18 effects a closing or opening respectively of the flow passage between housing 11, interior 14, and tube 18 bore 44. A locking mechanism 26 can be, for example, a knob threaded through tube 18 so that when tightened, it affixes the position of tube 22 with respect to tube 18. Thus, the flow rates of the first and second components of gaseous stream flow can be adjusted to allow more or less flow to enter tube 18 bore 44.

Because of the centrifugal forces acting upon heavier particles in the gaseous stream, these particles would abut and collect against baffle 16 until they reached openings 21. Such heavier particles would then travel through openings 21 and into lower interior 20 of housing 11. In the lower interior 20 of housing 11, an annular baffle 28 is placed. Because of the centrifugal flow of the gaseous stream, heavier particles would collect against the wall of housing 11 and pass between annular baffle 28 and the outer wall of housing 11. The space 27 in FIG. 1 would be a continuous annular space between the wall of housing 11 and baffle 28. That space 27 could be any desired dimension which would allow heavy particles to settle at 32. A second metallic screen electrode 24a, which is annular, attaches to and circumvents the wall of housing 11 at baffle 28 and can be used to attract particles entering space 27 so that these such particles either attach to the charged screen 24a or enter the space 32 below baffle 28 lower surface 30. Baffle 28 then deters reentry of such particles to the housing 11 interior above baffle 28. The area below the bottom 30 of baffle 28 provides a conical wall 34 portion of lower section 11b of housing 11. Valve 33 would allow periodic withdrawal of sediment or particle material from housing 11.

An outlet pipe 37 communicates at one end 39 portion with the lower interior 20 of housing 11 above baffle 28 so that gaseous material can flow from interior 20 into pipe 37 as illustrated by the arrow at inlet 39. Inlet 39 is preferably covered with filter material such as metallic mesh, vitrofibrous or a combinatio therof. Pipe 37 provides a bore 36 so that gas can flow through pipe 37 to the opposite end portion from inlet 39. At the opposite end portion of pipe 37 from inlet 39 is connected a bubbler assembly 38 having a lower surface 47 which is perforated with a plurality of minute openings 45. Each opening could be designed to produce a specific bubble size as the entire bubbler assembly 38 is positioned within chemical bath 42 and below the liquid surface 41 thereof. The arrows 46 in FIG. 1 and 3. Chemical bath 40 includes a liquid chemical which would be selective to react with very small particulate matter which enters inlet 39 and subsequently bore 36 of pipe 37 and discharges into bath 40 through openings 45. Bath 40 would be contained within a suitable vessel 42 which is sized to fit around bubbler assembly 38.

Housing 11, vortex tube 18, pipe 37, bubbler assembly 38, and container 42 would be manufactured of any suitable structural yet chemically inert material so that the entire apparatus would withstand long term use without suffering from chemical or pollutant corrosive effects. For example, stainless steel or structural steel coated with a chemically corrosive resistant coating could be used to manufacture the apparatus 10.

Because many varying and different embodiments may be made within the scope of the inventive concept herein taught, and because many modifications may be made in the embodiment of the law, it is to be understood that the details herein are to be interpreted as illustrative and not in a limiting sense.

What is claimed as invention is:

1. A gaseous stream pollution control apparatus comprising:
   a. a cylindrical housing having a curved outer vertical wall for confining therewithin a gaseous stream to be treated;
   b. a flow inlet communicating with the housing for introducing the gaseous stream into the upper end portion of said housing, the inlet having an axis of flow tangentially placed so that the gaseous stream entering the housing tracks a circular flow path;
   c. a primary flow outlet for discharging a primary gaseous component from the lower end portion of the housing;
   d. a vortex tube having a vertical central bore and being centrally positioned in the housing and extending below the flow inlet so that the circular flow path surrounds the vortex tube;
   e. a secondary outlet positioned at the top of the vortex tube for discharging a secondary gaseous component from the housing via the bore of the vortex tube;
   f. at last one passage opening in the bottom portion of the vortex tube for allowing gas flow between the circular flow path and the bottom of the vortex tube bore;
   g. repelling means associated with the passage means for repelling particulate matter which attempts to flow from the circular path to the vortex tube; an inverted frustrum shaped baffle having an opening therethrough, and connected at its upper edge in the top of said housing below the inlet and at its lower end to the vortex tube below the passages in the vortex tube thereby dividing the housing into an upper end portion above the baffle and a lower end portion below the baffle said opening allowing particulate matter under the influence of gravity that is sliding downwardly on the wall of the baffle to enter the lower end portion of the housing; and
   i. trap means for collecting particulate matter which falls from said baffle to the lower end portion of said housing.

2. The pollution control apparatus of claim 1 further comprising bubbler means for mechanically breaking up the primary gaseous component into bubbles.

3. The pollution control apparatus of claim 2 wherein the bubbler means, includes a chemical bath communicating with the primary outlet.

4. The pollution control apparatus of claim 1 wherein the repelling means is an electrically charged metal grid covering the vortex tube opening.

5. The pollution control apparatus of claim 1 further comprising means for adjusting the flow rates of the primary and secondary components of the gaseous stream.

6. An air pollution control device comprising:
   a. a cylindrical housing of generally uniform cross-sectional configuration having a top, a bottom and a curved outer wall for confining therewithin a gaseous polluted stream to be treated;
   b. a flow inlet communicating with the upper end portion of the housihg for introducing the gaseous stream into the upper end portion of the housing, the inlet having an axis of flow tangentially placed so that the gaseous stream entering the housing tracks a circular flow path which progresses through the housing of the top to the bottom thereof;
   c. a primary flow outlet positioned at the lower end portion of the housing for discharging a primary component of the gaseous stream from the housing;
   d. a central generally cylindrical, vortex tube having an interior bore and being centrally positioned in the housing and extending below the flow inlet so that the circular flow path generally surrounds the vortex tube during operation;

e. at least one passage opening formed in the lower end of the vortex so that a secondary component of the gaseous stream can pass from the cylindrical housing into the vortex tube;

f. an electrostatically charged screen positioned inside the housing on the at least one passage opening so that the charge carried by the screen can be used to repel charged particles contained within one of the components of the gaseous stream which have a like charge to the charge of the screen; an inverted frustrom shaped baffle having an opening therethough, and connected at its upper edge in the top of said housing below the inlet and at its lower end to the vortex tube below the passages in the vortex tube thereby dividing the housing into an upper end portion above the baffle and a lower end portion below the baffle, said opening allowing particulate matter under the influence of gravity that is sliding downwardly on the wall of the baffle to enter the lower end portion of the housing;

h. a transverse baffle positioned in the lower end portion of the housing and at least partially spaced inwardly from the housing curved wall so that particulate matter can fall under the influence of gravity to the bottom of the housing by passing between the transverse baffle and the housing curved wall; and i. chemical treatment means communicating with the primary flow outlet for removing particulate matter from the gasous stream which discharges from the housing via the primary outlet.

* * * * *